L. STEITLER.
BAKE PAN.
APPLICATION FILED AUG. 15, 1911.
1,021,640.
Patented Mar. 26, 1912.
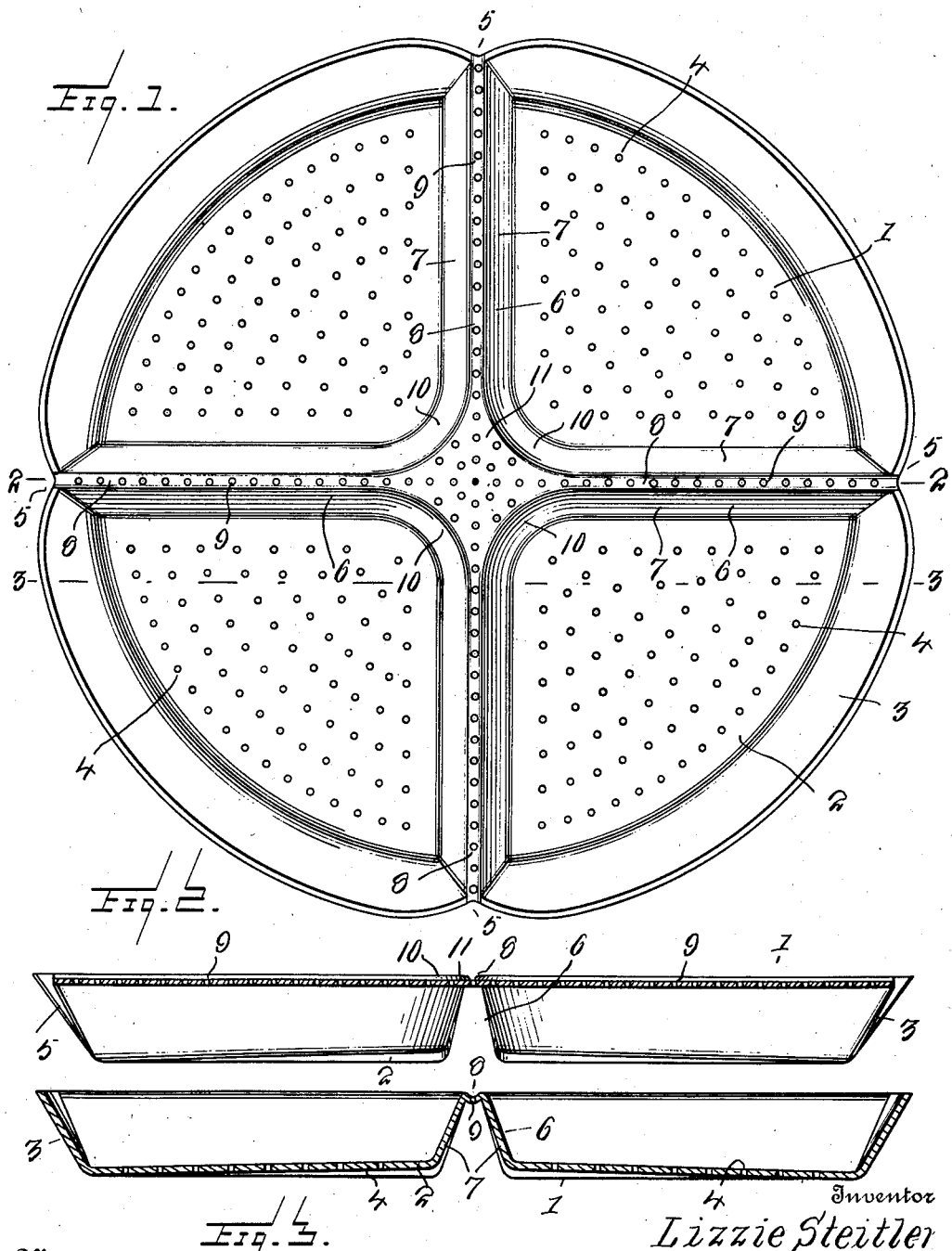
Witnesses
E. R. Ruppert
John J. McCarthy
Inventor
Lizzie Steitler
By Victor J. Evans
Attorney

UNITED STATES PATENT OFFICE.

LIZZIE STEITLER, OF OWENSBORO, KENTUCKY.

BAKE-PAN.

1,021,640.

Specification of Letters Patent.  Patented Mar. 26, 1912.

Application filed August 15, 1911. Serial No. 644,146.

*To all whom it may concern:*

Be it known that I, LIZZIE STEITLER, a citizen of the United States of America, residing at Owensboro, in the county of Daviess and State of Kentucky, have invented new and useful Improvements in Bake-Pans, of which the following is a specification.

The invention relates to improvements in bake pans and more particularly to pans for use in baking pies.

One object of the present invention is to provide a bake pan which shall be divided into separate and distinct compartments, the partitions forming said compartments being, preferably, formed integral with the bottom and inclosing wall of the pan.

Another object of the present invention is to provide a bake pan of this character which shall be divided into separate and distinct compartments, the partitions dividing said compartments being formed to provide means to facilitate the slicing of the pie.

With the above and other objects in view, which shall appear as the description progresses, the invention consists in the construction, combination and arrangement of parts hereinafter fully described, claimed, and illustrated in the accompanying drawings, wherein is shown the preferred embodiment of the invention, and wherein;

Figure 1 is a plan view of a bake pan constructed in accordance with the present invention. Fig. 2 is a cross section on the line 2—2 of Fig. 1, and Fig. 3 is a section view taken on the line 3—3 of Fig. 1, parts being broken away.

Referring more particularly to the accompanying drawings wherein like numerals of reference designate similar parts throughout the several views, the numeral 1 designates a pan constructed in accordance with the present invention, the same being stamped from sheet metal or other suitable material and having a bottom 2 and inclosing wall 3. The bottom 2 is preferably concaved in cross section and is provided with a plurality of perforations as shown at 4. The inclosing wall 3 inclines upwardly and outwardly from the bottom of the pan and is indented or grooved upon its upper edge as shown at 5, the grooves or indentations being arranged at intervals and spaced at equal distances from each other.

For the purpose of dividing the pan into compartments, a plurality of partitions or division plates are arranged interiorly of the pan and are formed integral with the bottom 2 and inclosing wall 3 thereof. The partitions 6 radiate from the center of the pan and are of a height equal to the similar dimension of the inclosing wall 3. The partitions 6 are identically constructed and therefore it is thought that a description of one will suffice for all. Each of the partitions comprise vertical side walls 7 which are formed integral with the bottom of the pan and are beveled upwardly therefrom and toward each other. At their meeting edges and on their upper surface the walls 7 are formed to provide a cutting groove 8, the latter being arranged intermediate the walls and formed with perforations 9. The cutting grooves 8 are coincident with and merge into the indentations 5 formed upon the upper edge of the inclosing wall 3 of the pan thereby enabling the material within the pan to be cut and divided into equal parts.

The partitions 6 at their meeting edges and centrally of the pan are provided with curved interconnecting portions 10, which latter are formed integral with the walls of the partitions and the bottom of the pan. Intermediate the connecting portions 10 of the partitions is formed an enlarged horizontal partition 11, which latter is perforated and arranged in a plane coincident with the plane of the cutting grooves 8, the partition 11 being provided for the purpose of coöperating with the perforations 4 in the bottom of the pan in discharging the moisture from the lower crust of the dough.

From this construction it will be seen that the moisture from the bottom of the dough is first discharged through the openings in the bottom of the pan thence upwardly and centrally of the pan and through the perforations in the partition 11 into the atmosphere.

While I have shown a pan divided into four parts, it is to be understood it may be divided into as many constituent compartments as desired.

From the above description taken in connection with the accompanying drawings it will be seen that the pie or other material being baked may be removed in single sections without disturbing the remaining sections or that the same may be removed as a whole, as desired.

Having thus described my invention what

I claim and desire to secure by Letters-Patent, is:

A bake pan having a perforated concaved bottom for the discharge of moisture, a plurality of partitions formed integral with said pan and dividing the same into compartments, portions interconnecting said partitions, and a horizontally arranged perforated partition intermediate said connecting portions and coöperating with said bottom in the discharge of moisture.

In testimony whereof I affix my signature in presence of two witnesses.

LIZZIE STEITLER.

Witnesses:
GROVER C. HILL,
BESSIE MAE GILLISON.